Sept. 6, 1960 M. P. LAUGHLIN 2,951,314
LAWN TOOL WITH CHEMICAL APPLICATOR
Filed Sept. 13, 1955
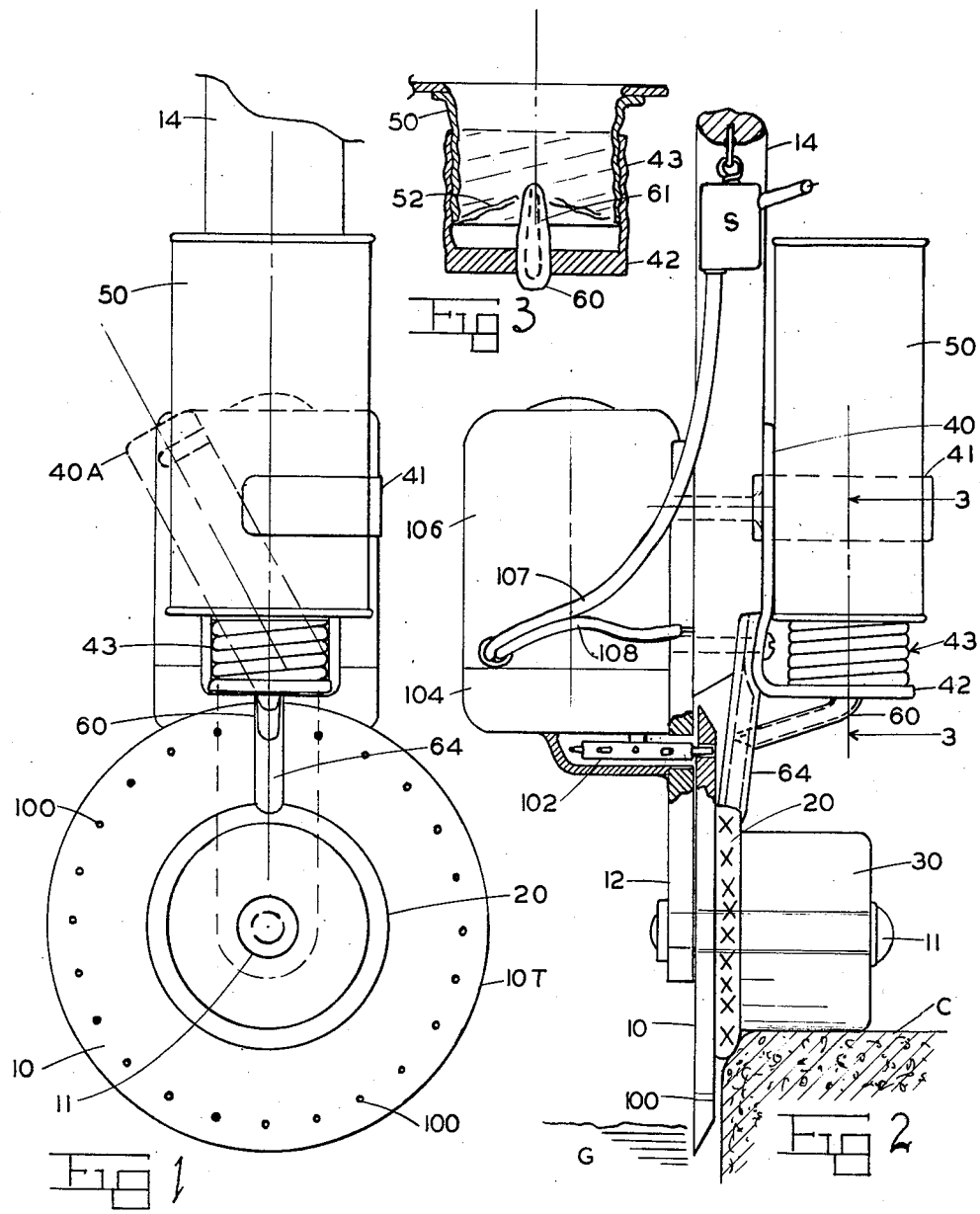
INVENTOR.
Myron P. Laughlin
BY

United States Patent Office

2,951,314
Patented Sept. 6, 1960

2,951,314

LAWN TOOL WITH CHEMICAL APPLICATOR

Myron P. Laughlin, 1705 Beach Drive SE.,
St. Petersburg, Fla.

Filed Sept. 13, 1955, Ser. No. 534,043

12 Claims. (Cl. 47—1)

This invention relates to vegetation cutting devices including chemical applicators as a part thereof.

Lawn tools, hand and power operated, are well known factors in lawn cultivation and have heretofore represented a major time and labor consumer out of proportion to the areas involved. It is the primary purpose of this invention to cut both time and labor substantially by making the tool operation effective for a much longer period without additional operator effort.

It is also a primary object of this invention to provide a device for so cutting and treating a lawn that it will confine its operational effects to the cut area and will not affect the remainder of the lawn or closely adjacent growth.

Another object of this invention is the provision of an easily directed compact mechanism for the purposes described which will automatically protect the user from chemicals employed, which will eliminate any necessary handling thereof and which will remove necessity for control valves and the like.

Certain other improvements and advantages will appear as this application proceeds and in the description of the appended drawings in which:

Fig. 1 is a frontal elevation of one form of cutter tool suited to my purposes and equipped therefor.

Fig. 2 is a side elevation of the device of Fig. 1 and is taken in partial section to aid in illustration of the parts described.

Fig. 3 is a cross section to enlarged scale of a detail of Fig. 2 and is taken substantially on the line 3—3 thereof.

Referring now to Fig. 1, a cutter wheel or disc 10 is mounted upon an arbor 11, mounted in extension piece 12 of the usual handle 14.

Disc 10 runs adjacent to and against feed wheel 20 and carrier wheel 30 both of which journal upon the arbor 11 already described. It will be understood that carrier wheel 30 serves to run upon the curb C and to bear a part of the weight of the whole mechanism as well as assist in the guidance thereof. Also upon handle 14, I prefer to mount a bracket 40 carrying a clip 41 and an extension 42 whereon mounts a threaded receptacle 43 into which the neck of a replaceable can 50 may be threaded when the whole is tilted as shown at 40A in Fig. 1.

It will be understood that sufficient tightening of bolt 11 will clamp members 10, 12, 20 and 30 together holding them stationary, thus "riding" upon includes "sliding and rolling movement" along curb C and like lines of demarcation for the lawn growth.

Extension 42 also serves to mount a tube 60 provided with an extension 61 which serves to pierce the inner seal 52 of the can 50 when the same is applied to receptacle 43. Tube 60 discharges into a flexible feeder tube 64 mounted as shown in Fig. 2 and bearing against feed wheel 20. Feed wheel 20 is preferably made of felt or like moisture absorbing material and serves to carry the growth control chemical discharged by can 50 through tubes 60 and 64 thereon. Feed wheel 20 is thus enabled to apply to curb C a coating of the chemical discharged from can 50 and it will be noted that it can so apply such chemical without human contact, since can 50 is applied in sealed condition and its seal only broken as it is applied, while hanging the entire device in inverted position will immediately stop all feed of the chemical from the can. It will also be apparent that the end of feed tube 64 bearing against feed wheel 20 will be substantially sealed thereby when the device is at rest and only feed as such wheel is turned by contact with the curb or when the absorbent properties of the feed wheel draw in the liquid.

Disc 10 serves to guide the edger along the curb and to abrade and sever vegetation which may be growing therealong at the time of application. It may follow any of the well known forms given to such wheels, and may have added openings 100 therein for engagement of a sprocket 102 driven through a gear reduction 104 by a motor 106, also mounted upon handle 14 so that disc 10 may be driven in a saw-like fashion by such motor (in this case, feed wheel 20 and roller 30 are preferably free to rotate independently upon arbor 11). Motor 106 is controlled by switch S and one of its leads 108 grounded through the chemical applicator, so that electrical current flow may assist electric-chemical action and deposit, it being understood that for non-electrical drive motor 106 is bridged and flow is direct. It will be understood that abrasion and cutting are done by these devices and that chemical is applied to such before the plant fluid outflow from the plant begins (in the instant before bleeding starts).

It will be manifest that while the applicant has described for purposes of illustration a simple form of garden tool particularly suited to forming the lawn edge, his means are fundamentally applicable to any cutter tool and to any other garden tool performing a plant abrasive action as a part of its operation and that such embodiments are well within the spirit of his invention.

What I claim is:

1. A line forming lawn edger provided with a continuous line turf cutter, a curb guide for said cutter, a chemical applicator mounted on said cutter guide, a discharge for said applicator discharging adjacent said cutter, said means in combination with discharge control means actuated by the motion of said edger to feed chemical from said applicator evenly adjacent said cutter and said guide.

2. A lawn edging device including in operative combination, a cutter adapted to separate lawn vegetation from adjacent curbs, a guide riding upon the edge of said curb, a feeder cooperating with said cutter and guide and positioned therebetween and a holder for vegetation destroying chemicals having its discharge adjacent to and discharging mainly through said feeder, whereby means are provided to cut the aforesaid vegetation along the curb and to simultaneously apply said chemical to and adjacent the curb edge to prevent regrowth thereover and thereon.

3. A lawn edging device as claimed in claim 2 wherein the cutter, guide and feeder are rotary.

4. A lawn edger as claimed in claim 2 wherein the cutting guide and feeder are stationary.

5. A lawn edging device as claimed in claim 3 wherein certain of the rotary elements are power driven.

6. A terminating edger for lawns and like cultivated areas wherein a sharp line of demarcation is desirable, said device including in combination a guide adapted to follow the aforesaid line of demarcation, a cutter to free the same of vegetation and operating with and guided by said guide, and a vegetation chemical inoculator carried by and operating with said guide and cutter to apply a prorated amount of said chemical efficiently and evenly along the cut produced by said cutter.

7. An edger of the type claimed in claim 6 wherein the chemical is applied as a liquid fed adjacent said cutter.

8. A lawn line demarking device provided with vegetation cleaving means for defining the edge of the lawn vegetation and having an electrical current applicator adjacent said cleaving means whereby electricity may flow through the clover vegetation and therethrough to the earth beneath said vegetation to abate growth in such vegetation and assist chemical reaction therein and in the earth beneath.

9. The lawn device of claim 9 wherein the electrical current also functions to operate the cleaving means stated therein.

10. A plant plot outline edging device capable of simultaneously defining the line of said plot and treating the plot adjacent said line with plant regrowth chemical in a single operation, including a single carriage support having guide and propulsion appendages and turf cutting means mounted thereon, said support also mounting chemical distributing means having their discharge at the side of said turf cutting means to inoculate the cut turf and plants to the side thereof simultaneously with the operation of the aforesaid turf cutting means, the whole providing means to accurately cut and define the plot edge and to inoculate plants at such edge and adjacent thereto with plant regrowth inhibitor to extend the cutting operation for a substantial period over that normally obtained by said cutting means.

11. A lawn plant growth cutting and chemical feeding device including a continuous plant growth cutting element and a continuous chemical applicator in cooperative combination therewith, said cutting element including plant growth abrasive means and said chemical applicator having a discharge immediately adjacent to the said cutter abrasive means so that lawn growth control chemicals fed by said applicator are automatically applied to the plant growths at the point of their abrasion by said cutter following the instant of such abrasion and before plant fluid outflow therefrom begins.

12. A systemic plant growth area cutting and chemical feeding device for simultaneous treatment of skin bearing systematic plants in said area which includes a continuous plant growth skin penetration and cutting element and a continuous chemical applicator in direct cooperative combination therewith and immediately adjacent to the first said element skin penetration means, said cutting element including the said skin penetration means and said chemical applicator having a discharge immediately adjacent to the skin penetration means thereof so that plant growth control chemicals, fed by said applicator, are automatically applied through the plant skin into the plant's system at the place of said penetration before plant fluid outflow therefrom begins.

References Cited in the file of this patent

UNITED STATES PATENTS

| | | |
|---|---|---|
| 728,312 | Smith | May 19, 1903 |
| 773,743 | Von Hoffmann | Nov. 1, 1904 |
| 1,010,260 | Hill | Nov. 28, 1911 |
| 1,299,406 | Tyson | Apr. 1, 1919 |
| 1,313,866 | Sopousek | Aug. 19, 1919 |
| 1,588,694 | Bishop | June 15, 1926 |
| 1,823,267 | Gilardi | Sept. 15, 1931 |
| 1,828,621 | Roberts | Oct. 20, 1931 |
| 1,836,009 | Atkins | Dec. 15, 1931 |
| 2,007,383 | Opp | July 9, 1935 |
| 2,185,659 | Chernow | Jan. 2, 1940 |
| 2,551,096 | Chittick | May 1, 1951 |
| 2,643,503 | Noyes | June 30, 1953 |
| 2,696,696 | Tigerman | Dec. 14, 1954 |
| 2,721,437 | Greenlund | Oct. 25, 1955 |
| 2,740,248 | Pickens | Apr. 3, 1956 |

FOREIGN PATENTS

| | | |
|---|---|---|
| 10,207 | Australia | of 1907 |
| 15,892 | Australia | of 1928 |
| 23,902 | Australia | of 1925 |
| 107,728 | Australia | June 29, 1939 |
| 16,804 | Great Britain | of 1891 |
| 487,569 | Great Britain | June 22, 1938 |

OTHER REFERENCES

Publication: Popular Science Monthly, September 1949, vol. 155, No. 3, page 92.